June 28, 1932.   H. M. BUNKER   1,865,301
BIAS CUTTING MACHINE
Filed Jan. 13, 1930   5 Sheets-Sheet 4
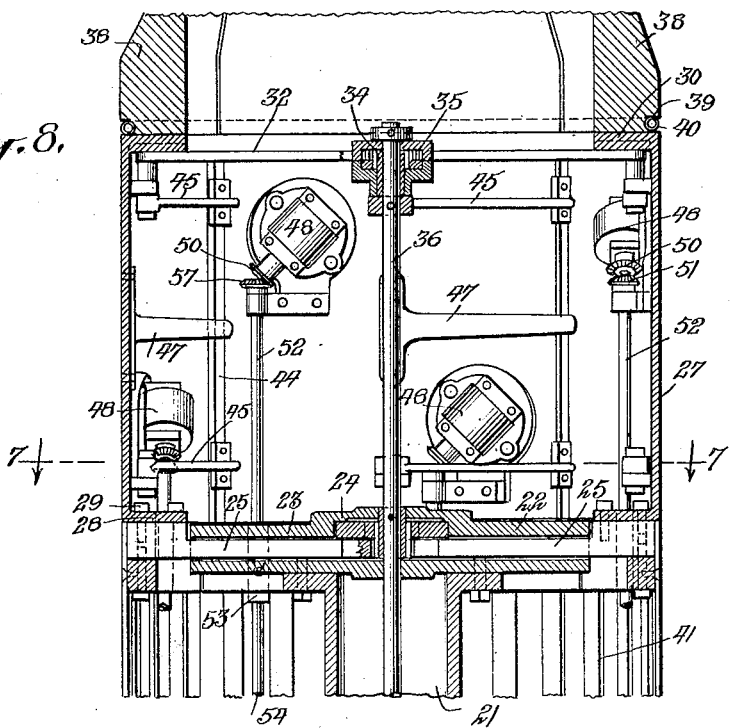
WITNESSES
INVENTOR
Horace M. Bunker
BY
ATTORNEYS June 28, 1932. H. M. BUNKER 1,865,301
BIAS CUTTING MACHINE
Filed Jan. 13, 1930 5 Sheets-Sheet 5

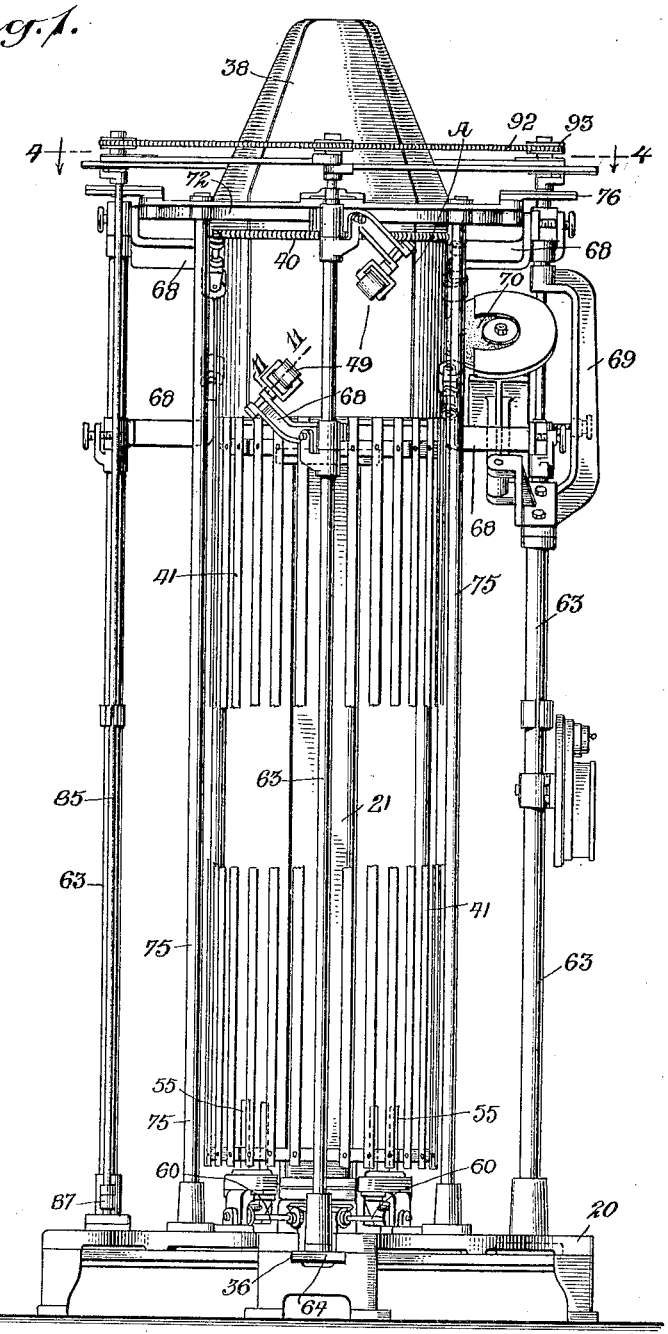

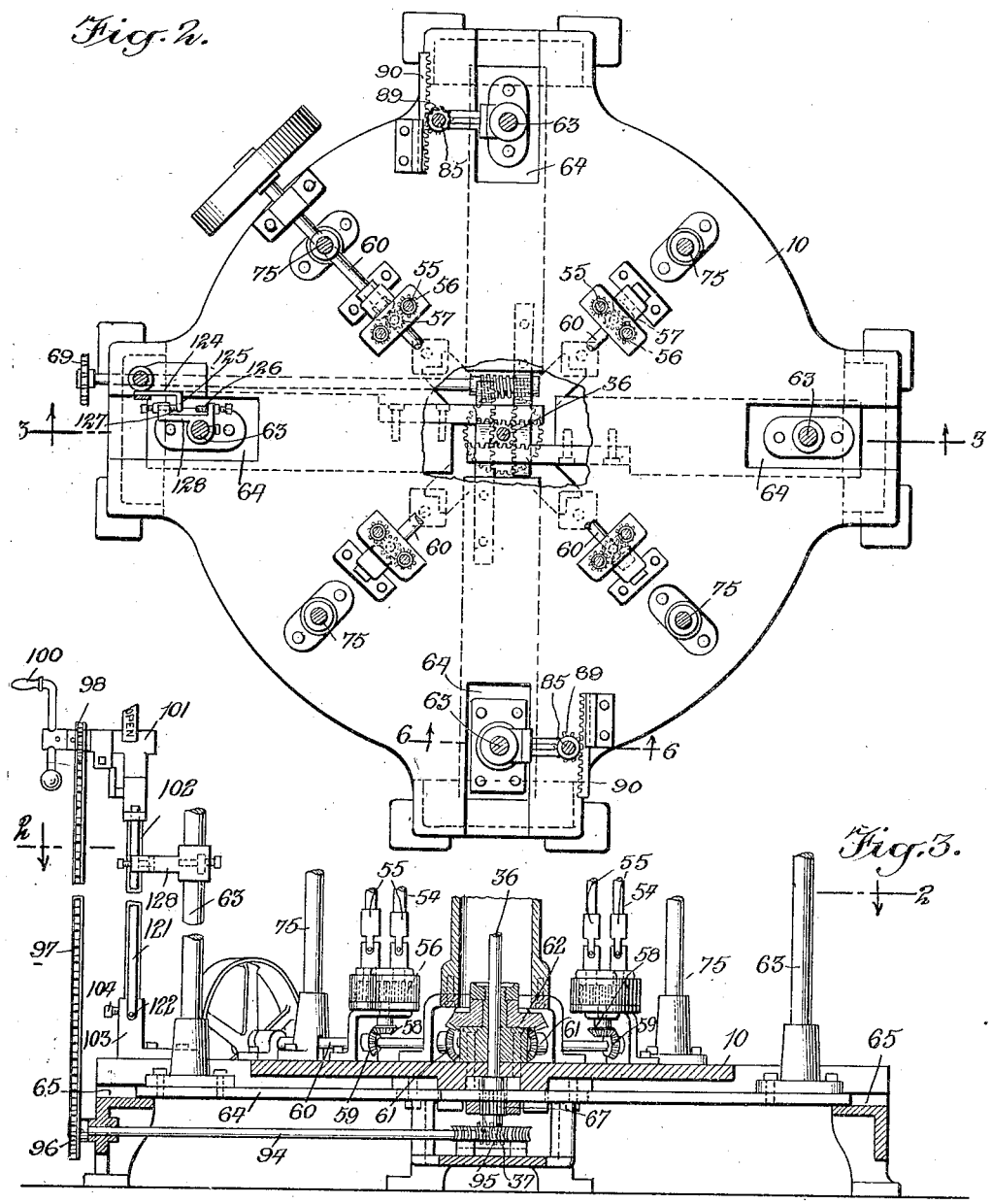

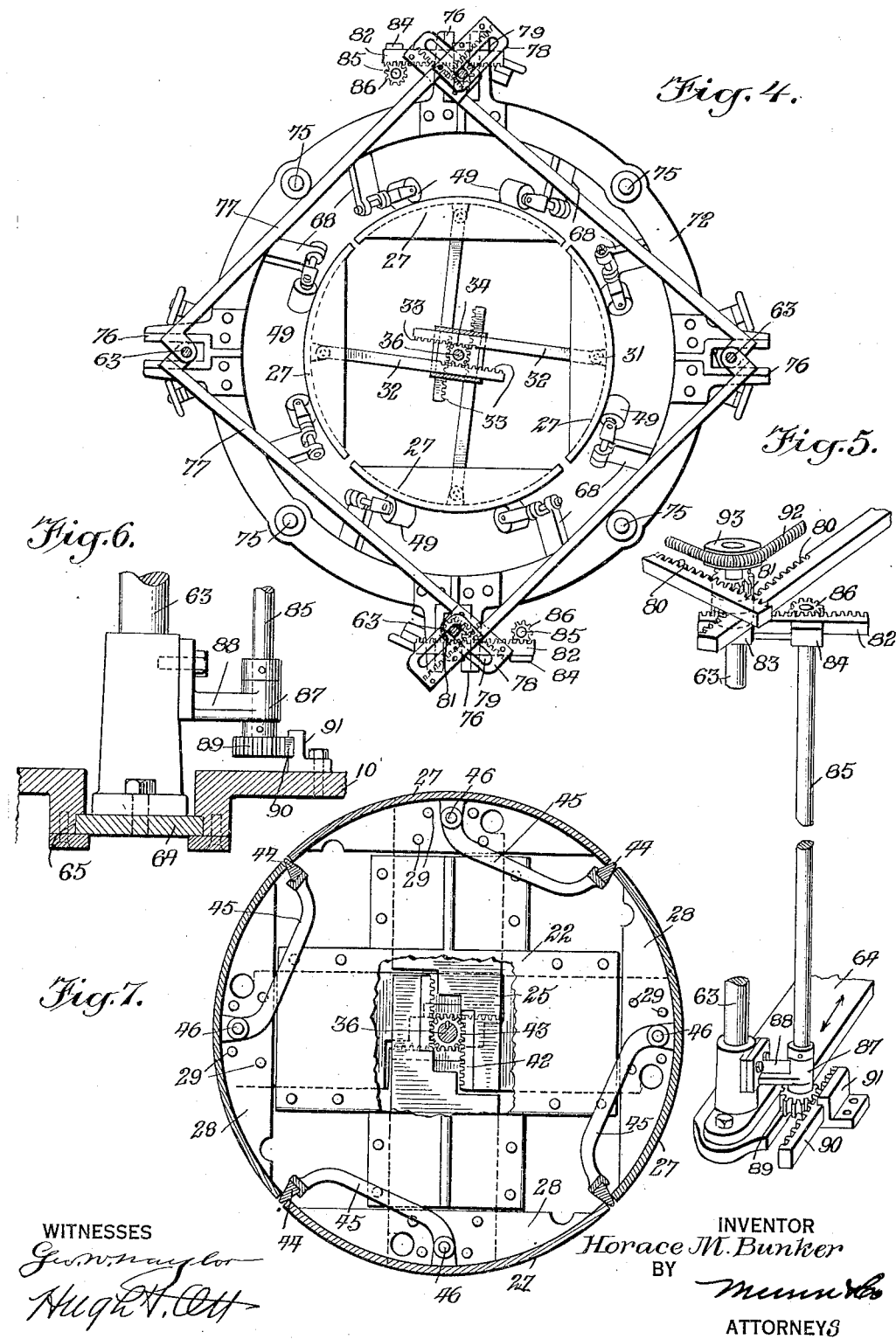

WITNESSES

INVENTOR
Horace M. Bunker
BY
ATTORNEYS

Patented June 28, 1932

1,865,301

UNITED STATES PATENT OFFICE

HORACE M. BUNKER, OF NEW YORK, N. Y., ASSIGNOR TO H. M. BUNKER & CO., INC., OF NEW YORK, N. Y., A CORPORATION OF NEW YORK

BIAS CUTTING MACHINE

Application filed January 13, 1930. Serial No. 420,542.

This invention relates to a machine for cutting strips spirally from tubular fabrics or textile materials in order that the strips thus produced will be on a bias to the weave or grain of the material, and the invention is in the nature of an improvement over prior United States Letters Patent Nos. 1,581,051 and 1,643,157, granted respectively on April 13, 1926 and September 20, 1927.

The machines constructed in accordance with the prior patents above referred to, included a pair of substantially semi-cylindrical sections having limited relative radial adjustments to compensate for variations in the diameter of the tubular material being cut. In practice, however, the employment of only two sections for this purpose has been found objectionable, in that upon maximum expansion or adjustment of the mandrel to the fabric tubes of larger diameters, the spiral feeding and cutting is seriously impeded and, hence, the side edges of the strips produced did not present a straight line and required trimming, which, obviously, resulted in a waste of both time and material.

In order to overcome this objection, the present invention aims primarily to provide a mandrel including more than two sections, all of which sections are mounted and supported in such a manner that they may be moved radially outward and inward in unison to increase or decrease the diameter of the mandrel without materially affecting its cylindrical shape.

The invention further comprehends means automatically operable when the mandrel sections are expanded and separated from each other, to bridge the gap between the sections to hold the material stretched across the gap outwardly and in more nearly peripheral alignment with the mandrel periphery.

The invention further contemplates an improved means for effecting the radial contraction and expansion of the mandrel sections while insuring proper rigidity thereof.

As a further feature, the invention embodies novel means for limiting the expansion and contraction of the mandrel sections to prevent binding thereof or subjection of the parts to undue strains and stresses.

Other objects of the invention reside in the comparative simplicity of construction of the machine, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of the machine, parts being broken away to disclose the underlying structure.

Figure 2 is a sectional plan view through the lower part of the machine, taken approximately on the line indicated at 2—2 in Figure 3.

Figure 3 is an enlarged fragmentary vertical sectional view through the lower portion of the machine, the same being taken approximately on the line indicated at 3—3 in Figure 2.

Figure 4 is a sectional plan view through the upper portion of the machine, taken approximately on the line indicated at 4—4 in Figure 1.

Figure 5 is a fragmentary detail perspective view of the means for radially adjusting the posts which support the pressure feed rollers and cutting mechanism.

Figure 6 is a fragmentary enlarged vertical sectional view taken on the line 6—6 of Figure 2.

Figure 7 is a sectional plan view taken approximately on the line 7—7 of Figure 8.

Figure 8 is a fragmentary vertical sectional view.

Figure 9 is a detail plan view of one of the upper rack bars.

Figure 10 is a similar view of one of the lower rack bars.

Figure 11 is a detail sectional view taken approximately on the line 11—11 of Figure 1.

Figure 12:
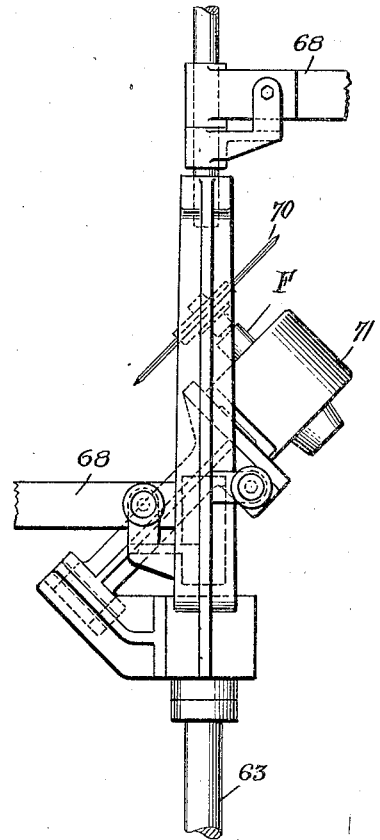
Figure 12 is an enlarged fragmentary detail view of the cutting knife and its support.
Figure 13:
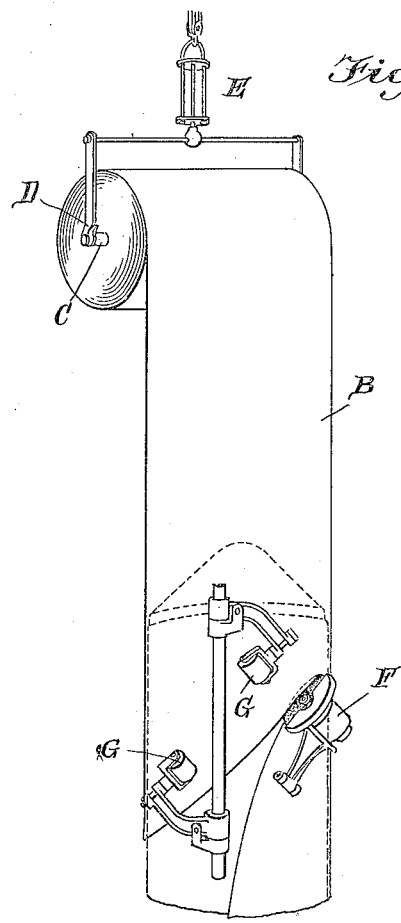
Figure 13 is a fragmentary perspective view illustrating the tubular material in feeding relation to the cutting and feeding mechanism.
Figure 14:
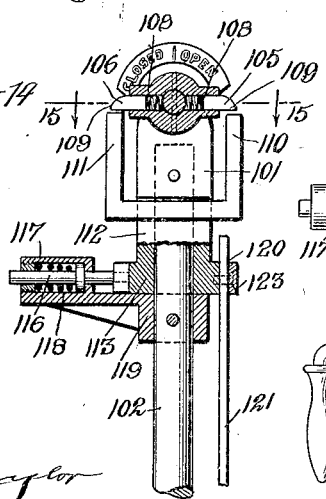
Figure 14 is an enlarged detail fragmentary sectional view of the mechanism for contracting and expanding the mandrel sections.
Figure 15:
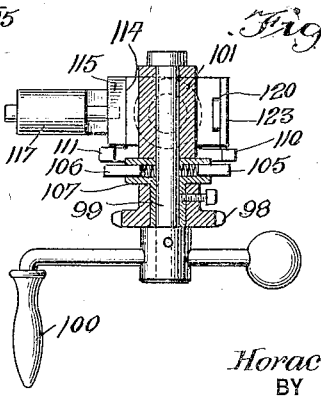
Figure 15 is a horizontal sectional view taken approximately on the line 15—15 of Figure 14.

Referring to the drawings by characters of reference, the machine includes broadly a mandrel A which is adapted to have spirally fed thereover the tubular cloth B, which is preferably rolled upon a core or shaft C mounted for rotation in the bearings D of a swiveled supporting element E, whereby to permit of the unrolling of the fabric and relative turning of the same with respect to the mandrel during the feeding operation.

The machine further includes broadly a cutting mechanism F and a feeding mechanism G which is carried by the mandrel member A, engages with the inner and outer faces of the material at circumferentially spaced points and which exerts an annular pull thereon to effect a spiral feeding of the same from the roll over the mandrel and with respect to the cutting mechanism.

The machine includes a base 20, from which a central hollow column 21 projects upwardly, which column carries at its upper end a cruciform head 22. The cruciform head 22 presents crossed guide channels 23 and 24, in each of which are mounted for sliding movement the bars 25.

The mandrel A is composed of a plurality, in the present instance four, of quadri-cylindrical sections 27 formed at their lower ends with in-turned flanges 28 which are attached by bolts or other securing elements 29 to the outer ends of the bars 25 respectively. The upper ends of the mandrel sections 27 are formed with in-turned flanges 30, on the under side of which flanges are fulcrumed at 31 rack bars 32, the rack teeth 33 of which mesh with a pinion 34. The free inner ends of the rack bars 32 extend through and are guided by a housing 35 so as to insure the proper cooperation of the rack teeth with the pinion 34 which is also arranged within the housing. The pinion 34 is keyed or otherwise secured to a vertical shaft 36 which extends downwardly through the housing 35 and centrally through the cruciform head 22, thence through the central column 21 and below the upper wall of the base 10, where it has secured to its lower extremity a worm wheel 37. Each of the mandrel sections is formed with an upwardly tapered head section 38, which head sections combine to produce a frusto-conical upper head for the mandrel for facilitating the initial positioning of the fabric tube over the same. The head sections 38 are supported directly from the in-turned upper flanges 30, and said head sections are rabbeted as at 39 to define an external peripheral groove within which a continuous contractile element, such as a coil contractile spring band 40, is arranged. Each of the mandrel sections 27 further supports a slatted frame or guard 41 which depends therefrom, and which combine to form a cage for preventing the cut fabric strips from becoming entangled in the mechanism. The bars 25 are formed with toothed rack sections 42 at their inner free extremities, and the teeth of said rack sections mesh with a pinion 43 which is secured to the shaft 36 for turning movement therewith. Under this construction and arrangement, it is obvious that the mandrel A is mounted and supported from the base in such a manner as to permit of the radial outward and inward movement of the sections thereof for increasing or decreasing the diameter of the same to compensate for fabric tubes of varying diameters. In view of the fact, however, that when the mandrel is expanded, the sections thereof present a gap between the ends of the adjacent sections, bridge or tension bars 44 are provided which are mounted on the free ends of supporting arms 45, which supporting arms are fulcrumed as at 46 to the inner side of the mandrel sections 27. Leaf springs 47 secured to the mandrel sections engage with the bars 44 for normally projecting the same outwardly to engage with the inner surface of the fabric tube.

The feeding mechanism G includes driven feed rollers 48 arranged internally of the mandrel and supported by the sections 27. The periphery of the feed rollers 48 extends through openings in the mandrel and slightly beyond the outer periphery thereof to engage with and feed the fabric spirally thereover. Idler rollers 49 are disposed exteriorly of the mandrel at the points directly opposite the driven feed rollers 48 for accomplishing the feed of the fabric. As illustrated, both the driven feed rollers and idler tension rollers 49 are disposed approximately at a 45° angle so as to accomplish the spiral feeding of the material. The inner driven feed rollers are turned through the medium of meshing bevel gears 50 and 51, the former being secured to the shaft of the roller 48 and the latter to a depending shaft 52. The shaft 52 is coupled by a universal joint 53 to a shaft section 54, which shaft section 54 is in turn connected by a universal joint 55 to a driving pinion 56. The driving pinion 56 meshes with a driven pinion 57 whose shaft carries a bevel gear 58 meshing with the bevel pinion 59 on a radial shaft 60. Each radial shaft 60 has at its inner end a bevel gear 61 which meshes with a master bevel gear 62. One of the radial shafts 60 is connected with a suitable prime mover in any desired manner, whereby the driven feed rollers are all driven in unison. In order to provide means for supporting the outer idler tension rollers 49 whereby they may be moved in unison radially inward and outward with the mandrel sections, a plurality of posts 63 are provided, each of which posts is anchored at its lower ends to a lower rack bar 64 radially slidable in guides 65 in the base. The rack bars 64 are formed with teeth 66 which mesh with a common pinion 67 keyed or otherwise secured to the shaft 36. The posts 63 carry adjacent their upper ends brackets 68 which support therefrom the idler rollers 49. One of the posts 63 is formed with a bracket section 69 which carries the cutting mechanism consisting of a rotary disc knife 70 driven by a suitable motor 71. In order to guide and brace the posts 63 at their upper ends, an annulus 72 is employed which is supported on stationary rods 75 which extend upwardly from the base. The annulus carries radially projecting forked guides 76, between the forks of which the posts extend, as clearly illustrated in Figure 4 of the drawings. The upper ends of two diametrically disposed posts 63 have each fulcrumed thereon a pair of rails 77 while the opposite extremities of the rails 77 are crossed and carry plates 78 having slots 79, through which the remaining pair of posts 63 extend. These ends of the rails are formed with rack teeth 80 which mesh with the pinions 81 rotatably mounted on the upper end of the posts 63. The pinions 81 in turn mesh with the teeth of a sliding rack bar section 82 which is suitably guided by the guides 83 on the posts 63 and by a guide 84 on a vertical rotary shaft 85. The rack bar sections 82 have their teeth meshing with the pinions 86 secured to the upper end of and rotatable with the shafts 85. The lower ends of the shafts 85 are journaled in bearings 87 carried by brackets 88 which are supported from the lower ends of the posts 63, and the lower ends of the shafts 85 have secured thereto pinions 89, the teeth of which mesh with the teeth of fixed rack bars 90 which are supported by brackets 91 in the base 10.

Under this construction and arrangement, it is obvious that upon rotation of the shaft 36 in a clockwise direction, as viewed in Figures 2, 4 and 7, the mandrel sections 27, as well as the posts 63, will be moved radially outward by the engagement of the teeth 34, 43 and 67 with the teeth 33, 42 and 66 of the rack bars 32, 25 and 64. Simultaneously, with the outward movement of the posts 63, the shafts 85 will be rotated, due to the meshing engagement of the pinions 89 with the fixed rack bars 90 and, obviously, the rotation of the shaft 85 will cause the pinions 86 engaging with the sliding racks 82 to transmit rotary motion to the pinions 81 which engage the teeth 80 of the rails 77. This will insure a corresponding outward movement of the fulcrumed ends of each pair of rails 77, whereby the idler rollers 49 will be moved in unison with the mandrel sections 27. In order to further brace and tension the upper ends of the posts against outward radial movement, a contractile belt 92 is trained around sheaves 93 which are rotatably supported by the upper ends of the posts 63. Conversely, rotation of the shaft 36 in a counter-clockwise direction, as viewed in Figures 2, 4 and 7, the sections of the mandrel, as well as the posts 63, will be moved radially inward to contract and reduce the diameter of the mandrel and to move the idler rollers 49 in unison therewith.

In order to provide means for effecting the rotation of the shaft 36 in opposite directions to accomplish the purposes aforesaid, a radial shaft 94 is journaled in the base 10 with its outer end protruding therebeyond. The inner end of the shaft 94 is provided with a worm 95 which engages the worm wheel 37, while the protruding outer end of the shaft 94 has secured thereto a sprocket 96. A sprocket chain 97 is trained around the sprocket 96 and around a superposed sprocket 98 which is attached to an operating shaft 99 having an operating crank 100. The shaft 99 is journaled in a bearing 101 carried by the upper end of an upright post 102 which is vertically adjustable in a step bearing 103 attached to the base 10 whereby to take up slack in the sprocket chain due to wear. A set screw 104 functions to maintain the post in vertically adjusted position in the step bearing. In order to positively limit the turning of the shaft 99 by the crank 100 in opposite directions when the maximum and minimum expansion and contraction of the mandrel is obtained, stop fingers 105 and 106 are carried by and project radially from a collar or sleeve 107 which turns with the shaft 99. The fingers 105 and 106 project radially at diametrically opposite points from the collar or sleeve 107 and are normally forced outward a limited distance by means of the springs 108. The fingers are provided with beveled terminals 109 which are designed to cooperate with the upwardly projecting ends 110 and 111 of a U-shaped yoke member which is carried by a collar 112 swiveled on the post 102. The collar 112 is formed with a rectangular base 113 presenting a flat face 114 with which a detent 115 cooperates. The detent is provided with a stem 116 which extends through a bearing 117 and which is normally moved axially to impinge the detent against the flat face 114 by a spring 118. The bearing 117 constitutes part of a bracket 119 which is supported by the post 102 and between which bracket and the bearing 101 the collar 112 is confined. The face of the base 113 diametrically opposite the face 114 is notched as at 120 to receive the upper end of an arm 121, the lower end of which is fulcrumed at 122 to the step bearing 103 for swinging movement. The upper end of the arm 121 which is disposed in the notch 120 is confined therein by a retaining plate 123. The arm 121 is provided with an inwardly projecting finger 124 having an angularly disposed terminal 125 which is arranged in the path of movement of a pair of adjustable actuator screws 126 and 127 which are carried in a bracket 128 attached to one of the posts 63.

In operation, when the shaft 99 is rotated in a direction to expand to the mandrel, the outward movement of the posts 63 will eventually cause the contact of the abutment screw 126 with the terminal 125 of the finger 124, thereby causing the arm 121 to be swung outwardly to turn the U-shaped member carried by the collar 112 until the end 110 reaches a position where the stop finger 105 engages the same to positively prevent further turning movement of the shaft 99 in the direction indicated. The shaft may be turned in the opposite direction, however, due to the fact that the beveled extremity 109 will permit the stop finger 105 to be cammed inwardly for passing the end 110.

What is claimed is:

1. In a bias cutting machine including a base and a cylindrical mandrel over which a tubular material is adapted to be spirally fed and cut, said mandrel including more than two sections and means for supporting said sections from said base to permit of relative radial outward and inward movement and means for moving all of said sections simultaneously for increasing and decreasing the diameter of the mandrel, while maintaining its substantially cylindrical form.

2. In a bias cutting machine, a hollow cylindrical mandrel over which a tubular material is adapted to be spirally fed and cut, said mandrel including more than two sections, means for supporting said sections to permit of simultaneously outward or inward radial movement thereof to expand and contract the mandrel, while maintaining its substantially cylindrical form, feeding and cutting means and means for supporting said feeding and cutting means for movement coincident with the mandrel sections.

3. In a bias cutting machine, a hollow cylindrical expansible mandrel over which a tubular material is adapted to be spirally fed and cut, said mandrel including a plurality of sections, means for supporting said sections to permit of outward and inward radial movement thereof to expand and contract the mandrel, feeding and cutting means, means for supporting said feeding and cutting means for movement coincident with the mandrel sections and a common means for simultaneously effecting the outward or radial inward movement of all the mandrel sections and cutting and feeding means.

4. In a bias cutting machine, a base, a hollow cylindrical mandrel including a plurality of sections supported from the base for radial outward and inward movement, driven feeding means carried by the mandrel sections, idler feeding means independent of the mandrel cooperating with the driven feeding means for spirally feeding a tubular material over the mandrel, cutting means independently of the mandrel, said cutting means being mounted for radial outward and inward movement coincident with the mandrel sections.

5. In a bias cutting machine, a base, a hollow cylindrical mandrel including a plurality of sections supported from the base for radial outward and inward movement, driven feeding means carried by the mandrel sections for spirally feeding a tubular material thereover, idler feeding means independent of the mandrel, cutting means independent of the mandrel, supporting means for said idler feeding means and cutting means mounted for radial outward and inward movement coincident with the mandrel sections and a common actuating means for effecting the simultaneous outward or inward movements of the mandrel sections and the idler feed and cutting elements in unison with the mandrel sections.

6. In a bias cutting machine, a base, a stationary central upstanding hollow column on said base, circumferentially spaced upstanding posts supported by the base and mounted for outward and inward radial movement, a hollow cylindrical mandrel including a plurality of sections supported by the upper end of the column for outward and inward radial movement, cooperating means carried respectively by said posts and by the mandrel for spirally feeding a tubular material thereover and a common means for effecting simultaneous outward or inward movements of the mandrel sections and posts in unison.

7. In a bias cutting machine, a base, a stationary central upstanding hollow column on said base, circumferentially spaced upstanding posts supported by the base and mounted for outward and inward radial movement, a hollow cylindrical mandrel including a plurality of sections supported by the upper end of the column for outward and inward radial movement, cooperating means carried respectively by said posts and the mandrel for spirally feeding a tubular material thereover and cutting the same and a common actuating means for effecting the simultaneous outward or inward movements of the mandrel sections and said posts in unison.

8. In a bias cutting machine, a base, a stationary central upstanding hollow column on said base, circumferentially spaced upstanding posts supported by the base and mounted for outward and inward radial movement, a hollow cylindrical mandrel including a plurality of sections supported by the upper end of the column for outward and inward radial movement, cooperating means carried respectively by said posts and the mandrel for spirally feeding a tubular material thereover and cutting the same, a common actuating means for effecting the simultaneous outward or inward movements of the mandrel sections and said posts in unison and means for limiting the operation of said actuating means to control the maximum and minimum adjustments thereof.

9. In a machine for cutting a strip spirally from a tubular fabric whereby to produce a fabric strip on the bias to the weave of the same, a mandrel over which one end of the fabric is initially positioned, means associated with the mandrel for engaging the inner and outer surfaces of the tubular fabric to feed the same longitudinally and rotatably over the mandrel and a cutting means tangentially engaging the fabric and disposed at an angle with respect thereto for severing the same on a spiral line during the feeding operation, said feeding means including a plurality of circumferentially spaced sets of inner positively driven feed rollers carried by the mandrel and outer tensioned pressure rollers independent of the mandrel, the mandrel having openings therein through which the peripheries of the driven feed rollers slightly protrude, said mandrel being of hollow cylindrical formation and composed of a plurality of sections, means for supporting said mandrel sections to permit of outward and inward radial movement thereof to expand and contract the mandrel and independent means for supporting the tensioned pressure rollers and cutting means mounted for radial outward or inward movement coincident with the mandrel sections.

10. In a machine for cutting a strip spirally from a tubular fabric whereby to produce a fabric strip on the bias to the weave of the same, a mandrel over which one end of the fabric is initially positioned, means associated with the mandrel for engaging the inner and outer surfaces of the tubular fabric to feed the same longitudinally and rotatably over the mandrel and a cutting means tangentially engaging the fabric and disposed at an angle with respect thereto for severing the same on a spiral line during the feeding operation, said feeding means including a plurality of circumferentially spaced sets of inner positively driven feed rollers carried by the mandrel and outer tensioned pressure rollers independent of the mandrel, the mandrel having openings therein through which the peripheries of the driven feed rollers slightly protrude, said mandrel being of hollow cylindrical formation and composed of a plurality of sections, means for supporting said mandrel sections to permit of outward and inward radial movement thereof to expand and contract the mandrel, independent means for supporting the tensioned pressure rollers and cutting means mounted for radial outward and inward movement coincident with the mandrel sections and a common actuating means for simultaneously effecting the outward or inward movements of the mandrel sections and supporting means for the tensioned rollers and cutting means.

11. In a bias cutting machine, a base, an upstanding radially contractible and expansible hollow mandrel, cooperating means for spirally feeding a tubular material thereover and cooperating means for cutting a spiral strip therefrom, said mandrel including a plurality of sections supported from the base respectively for radial outward and inward movement and means for effecting simultaneous outward and inward movement of the sections to increase and decrease the diameter of the mandrel.

12. In a bias cutting machine, a base, an upstanding radially contractible and expansible hollow mandrel, cooperating means for spirally feeding a tubular material thereover and cooperating means for cutting a spiral strip therefrom, said mandrel including a plurality of sections supported from the base respectively for radial outward and inward movement and means for effecting simultaneous outward and inward movement of the sections to increase and decrease the diameter of the mandrel, said means consisting of a vertically disposed rotary shaft having vertically spaced pinion sections secured thereto and vertically spaced rack bars secured to the mandrel section and projecting inwardly therefrom and having their teeth meshing with the teeth of the pinions.

13. In a bias cutting machine, a base, an upstanding radially contractible and expansible hollow mandrel, cooperating means for spirally feeding a tubular material thereover and cooperating means for cutting a spiral strip therefrom, said mandrel including a plurality of sections supported from the base respectively for radial outward and inward movement and means for effecting simultaneous outward and inward movement of the sections to increase and decrease the diameter of the mandrel, said means consisting of a vertically disposed rotary shaft having vertically spaced pinion sections secured thereto and vertically spaced rack bars secured to the mandrel section and projecting inwardly therefrom and having their teeth meshing with the teeth of the pinions and means for effecting rotation of said shaft in opposite directions.

HORACE M. BUNKER.